Sept. 6, 1949.	M. GOLD	2,481,106
RETRACTABLE HANDLE FOR MOTION-PICTURE
PROJECTOR CARRIERS
Original Filed June 25, 1942	3 Sheets-Sheet 1
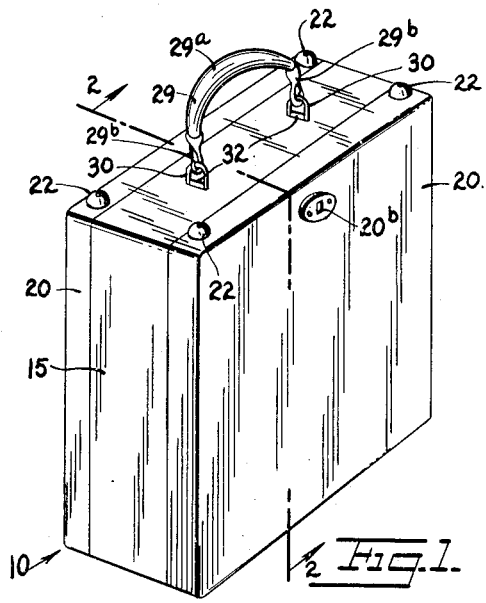
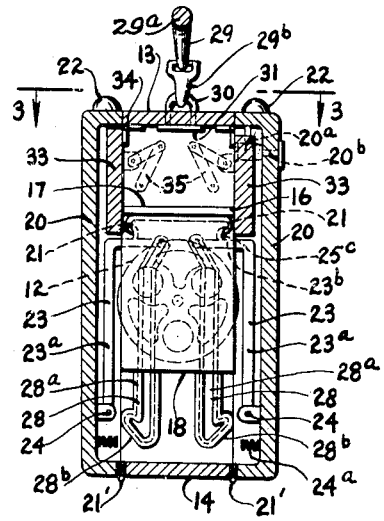
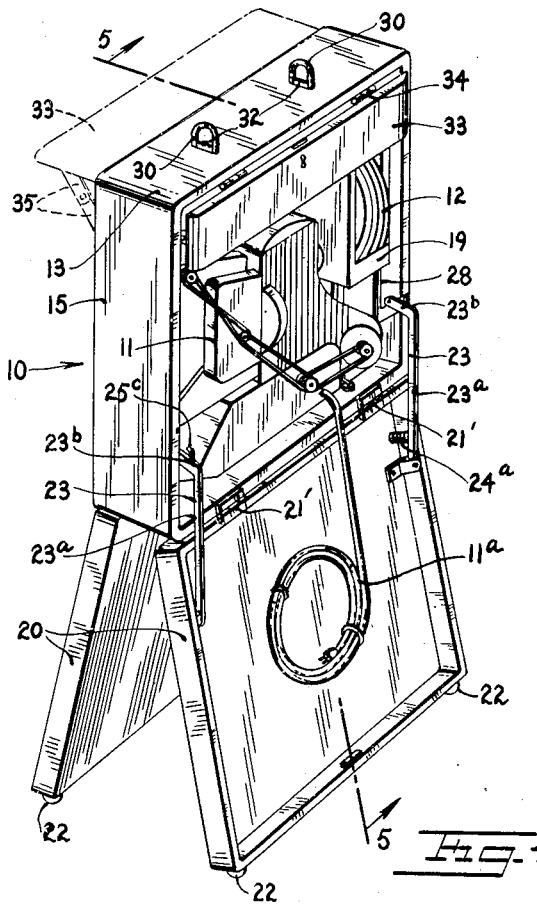
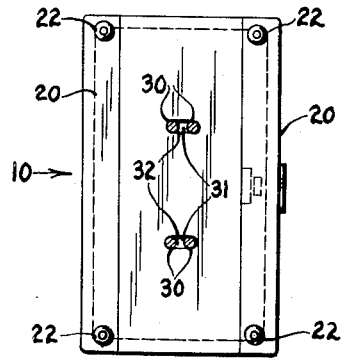
INVENTOR.
MAX GOLD
BY
Zoltan Holochek
ATTORNEY.

Sept. 6, 1949.　　　　　M. GOLD　　　　　2,481,106
RETRACTABLE HANDLE FOR MOTION-PICTURE
PROJECTOR CARRIERS
Original Filed June 25, 1942　　　　　3 Sheets-Sheet 2
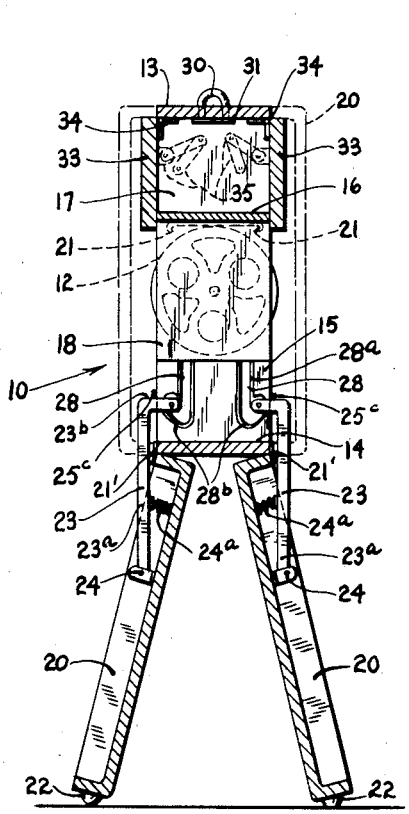
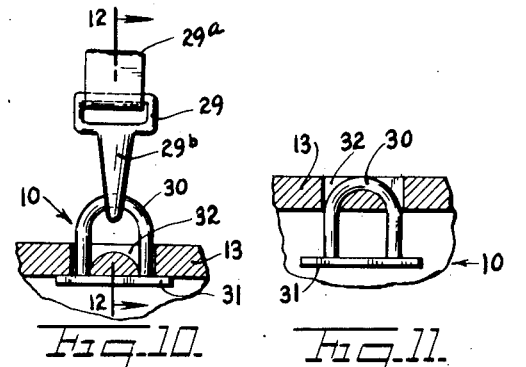
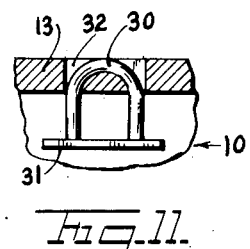
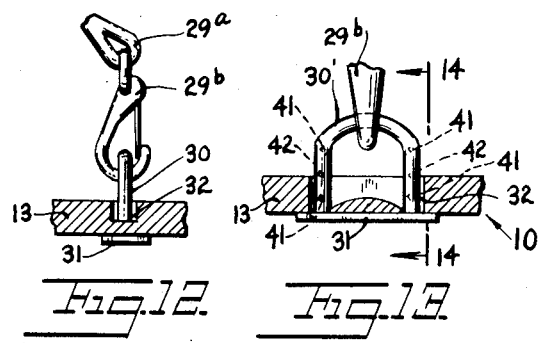
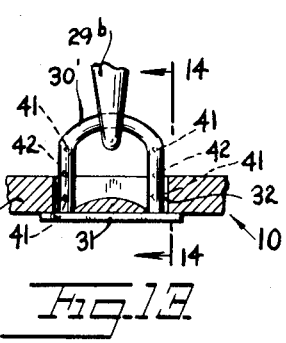
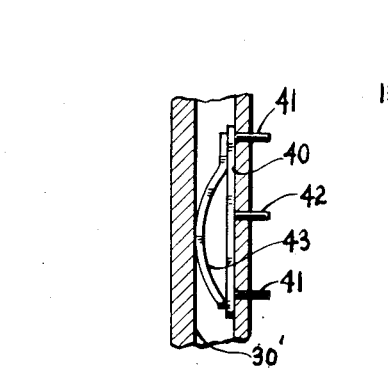
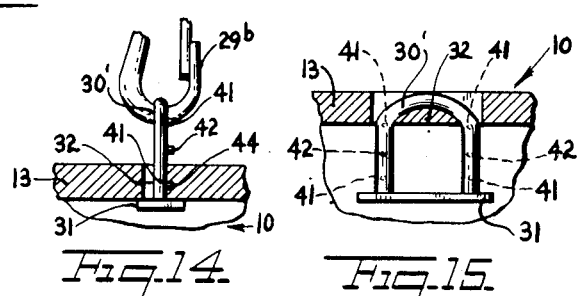
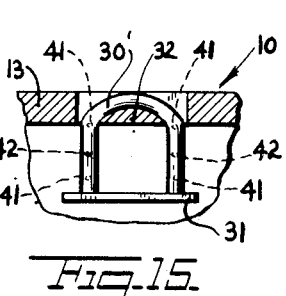
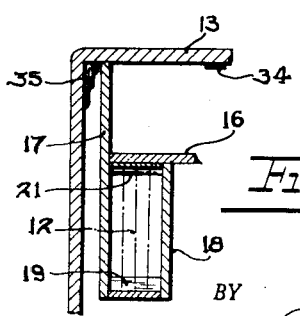
INVENTOR.
MAX GOLD
BY
Zoltan H. Holocher
ATTORNEY.

Sept. 6, 1949.　　　　　　　M. GOLD　　　　　　2,481,106
RETRACTABLE HANDLE FOR MOTION-PICTURE
PROJECTOR CARRIERS
Original Filed June 25, 1942　　　　　　　　3 Sheets-Sheet 3
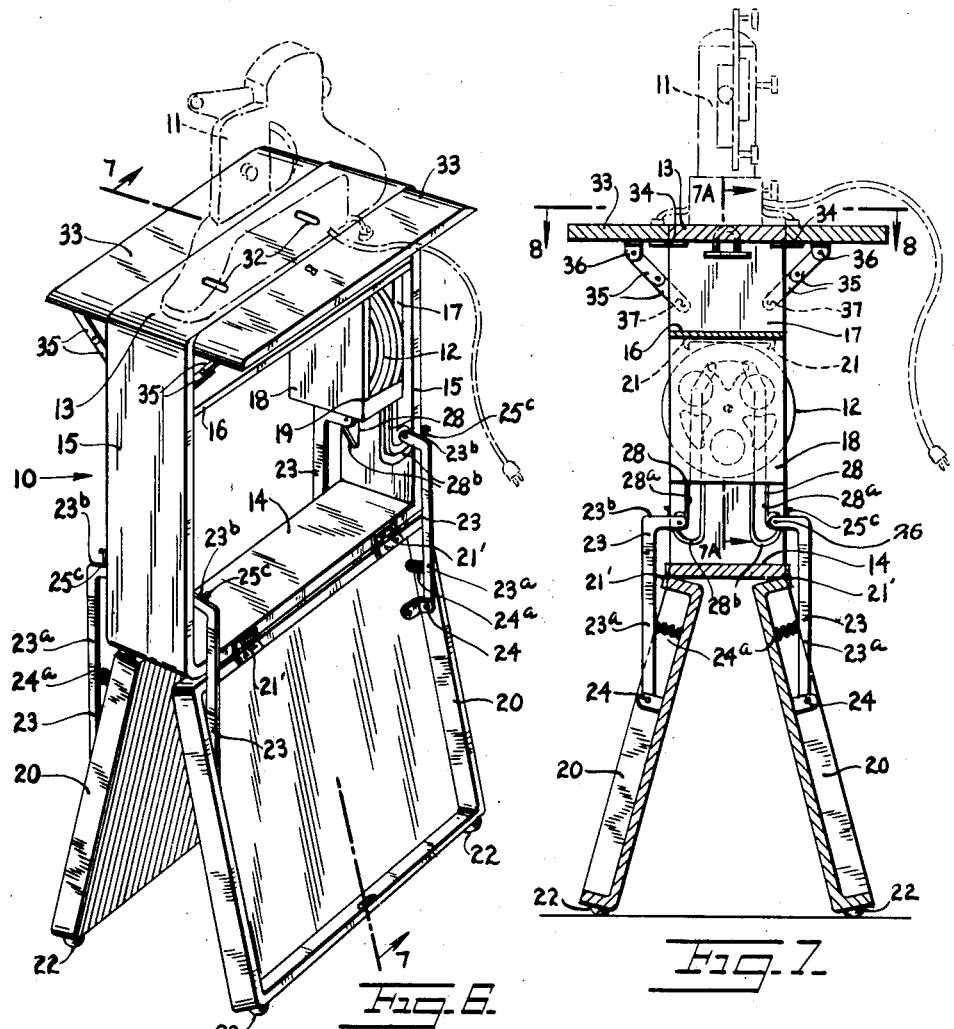
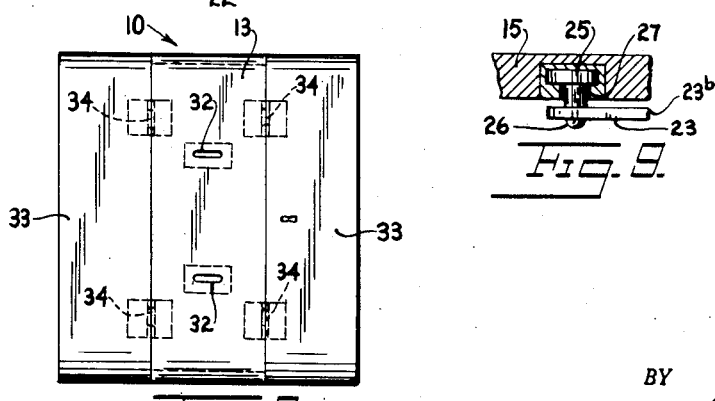
INVENTOR.
MAX GOLD
BY
ATTORNEY.

Patented Sept. 6, 1949

2,481,106

UNITED STATES PATENT OFFICE 2,481,106

RETRACTABLE HANDLE FOR MOTION-PICTURE PROJECTOR CARRIERS

Max Gold, New York, N. Y.

Substituted for application Serial No. 448,404, June 25, 1942. This application March 11, 1947, Serial No. 733,802

7 Claims. (Cl. 224—45)

This invention relates to new and useful improvements in a combined carrier and stand for motion picture projectors.

The present application is a substitute for my abandoned application filed on June 25, 1942, Serial No. 448,404.

More specifically the invention proposes the construction of a combined carrier and stand for motion picture projectors characterized by a rectangularly shaped tubular housing having its front and back sides open and arranged in a manner so as to receive and house a motion picture projector and films for use therein.

Still further it proposes to provide covers hingedly mounted upon the bottom portion of the housing for extension across the open sides of said housing for closing the same and arranged in a manner to be extended downwards at an outwardly diverging angle for forming legs for supporting the tubular housing at an elevation to permit the same to be used as a stand for supporting the projector at an operative elevation.

A further object of this invention proposes the use of angularly shaped brackets arranged in a novel manner between the end walls of the tubular housing and portions of the covers in a manner to retain the covers in the downwardly and outwardly diverged pivoted positions.

A further object of this invention proposes to mount lugs removable upon the top wall of the housing in a manner to permit a carrying handle to be engaged therewith in the closed condition of the carrier to be conventionally carried from place to place.

A still further object of this invention proposes the application of extendable leaves to the top wall of the housing which are adapted to be pivoted to a horizontal position when the covers are pivoted to their downward position for the purpose of increasing the overall width of the top wall to provide a greater amount of space to increase the supporting area of this top wall.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a combined carrier and stand for motion picture projectors constructed in accordance with this invention.

Fig. 2 is a vertical sectional view taken on the line 2—2 of Fig. 1.

Fig. 3 is a view looking in the direction of a line 3—3 of Fig. 2.

Fig. 4 is a view of the combined carrier and stand in its partially opened condition.

Fig. 5 is a vertical sectional view taken on the line 5—5 of Fig. 4.

Fig. 6 is a view similar to Fig. 4 but illustrating the carrier in its completely open position.

Fig. 7 is a vertical sectional view on the line 7—7 of Fig. 6.

Fig. 7A is a vertical sectional view on the line 7A—7A of Fig. 7.

Fig. 8 is a plan view looking in the direction of the line 8—8 of Fig. 7.

Fig. 9 is a horizontal sectional view taken through the top end of one of the supporting arms for the covers.

Fig. 10 is a vertical sectional view taken through the top wall of the housing adjacent one of the lugs for the carrying handle.

Fig. 11 is a view similar to Fig. 10 but illustrating the supporting lug with the carrying handle disengaged therefrom and being dropped to an inoperative position.

Fig. 12 is a vertical sectional view taken on the line 12—12 of Fig. 10.

Fig. 13 is a view similar to Fig. 10 but illustrating a modification of the invention.

Fig. 14 is a vertical sectional view taken substantially on the line 14—14 of Fig. 13.

Fig. 15 is a view similar to Fig. 13 but with the carrying handle removed from the lug and the latter illustrated moved to an inoperative position.

Fig. 16 is an enlarged vertical sectional view taken through one of the arms of the lugs shown in Fig. 13.

The combined carrier and stand for a motion picture projector according to this invention comprises a rectangularly shaped tubular housing 10 having its front and back sides open and adapted to receive and house a motion picture projector 11 and films 12. The housing more specifically consists of a top wall 13 and a bottom wall 14 which are held in a superimposed spaced condition by means of a pair of spaced vertical parallel extending side walls 15.

The motion picture projector normally rests upon the bottom wall 14 and a means is provided for conveniently carrying the films 12 in a rolled condition upon conventional film spools. This means comprises a shelf 16 having one end attached to one of the end walls 15. The other end of the shelf 16 is attached to a downwardly extending bracket 17. This bracket 17 has its top end secured to the bottom face of the top wall 13 and extended downwardly parallel to the other end wall 15 and slightly spaced therefrom. A second bracket 18 extends downwardly from the bottom face of the shelf 16 parallel to the bracket 17 and spaced slightly therefrom. An auxiliary shelf 19 is mounted between the bottom ends of the brackets 17 and 18 and acts as support for the films 12 as shown in Fig. 7A.

A means is provided for closing the open front and back sides of the housing 10. This means comprises a pair of covers 20 mounted upon the bottom portion of the housing and extending upwards across the open front and back sides of the housing. These covers 20 are pivotally supported by means of hinges 21' upon the front and back edge portions of the bottom wall 14 of the housing 10 and are provided with locks 20ª which may close or release the cover 20 by using a key through the key hole 20ᵇ. These covers in the inoperative position of the carrier are extended across the open sides of the housing. However, it is possible to pivot the covers 20 into a downwardly and outwardly diverged position for acting as legs for supporting the housing at an elevation to support the projector 11 upon the top wall of the housing 13 at an elevation at which it might be used to project a film upon a screen.

The free edge portions of the cover 20 are provided with rubber elements 22 which are adapted to engage against the floor or other supporting surface when the covers 20 are being used as legs for frictionally holding the stand in position and prevent accidental movement thereof.

Means is also provided for holding the covers 20 in their outwardly and downwardly diverged positions. This means comprises a pair of inverted L-shaped brackets 23 for each of the covers 20. These brackets 23 comprise a vertical long arm 23ª and a short top arm 23ᵇ extending at right angles to the vertical portion 23ª. The bottom ends of the vertical portions 23ª are pivotally attached to the covers 20 by means of pins 24 and the arms 23ª are forced outwardly by springs 24ª located between the arms 23ª and cover 20. The free ends of the short top arms 23ᵇ have rollers 25 rotatively attached thereto by means of a pin 26 (see Fig. 9).

These rollers 25 are spaced from the adjacent face of their respective brackets 23 by means of a spacer block 27 mounted upon the pin 26 and arranged between the adjacent faces of the bracket 23 and the roller 25. The short arms 23ᵇ are also formed with hooks 25ᶜ adapted to be frictionally engaged by spring catches 21, secured to the bottom side of the shelf 16, and to hold the brackets 23 by the tension of the spring catches 21 when the cover is closed.

The inside face of the spaced end walls 15 of the housing 10 are provided with substantially L-shaped grooved channels 28. The grooves in these channels 28 are T-shaped in cross section for housing the rollers 25. Each of the grooved channels 28 comprises a vertical portion 28ª and a bottom portion 28ᵇ extended upwards and outwards from the bottom end of the vertical portion 28ª. The construction is such that when the covers 20 are in their closed position the rollers 25 are housed within the top end of the vertical portion 28ª of the grooved channel 28 as shown in Fig. 2. To open the covers 20 it is merely necessary to pivot the same about the hinges 21' which will cause the brackets 23 to move therein and move the rollers 25 to an aligned position with the bottom portions 28ᵇ of the grooved channel 28.

The top ends of the brackets 23 are then pulled outwardly to cause the roller 25 to move along the length of the upwardly diverged end portions 28ᵇ of the grooved channel 28. Due to the fact that these bottom end portions of the grooved channel 28 are diverged upwardly the rollers 25 will retain their engaged position within the end of these portions 28ᵇ of the groove until the brackets 23 are again manually urged inwardly to cause the rollers 25 to be aligned with the vertical portions 28ª of the grooves.

Lugs are removably mounted on the top wall 13 of the housing 10 for receiving a carrying handle 29 in the closed position of the carrier as shown in Fig. 1 to permit the device to be conveniently carried from place to place. Each of these lugs comprises an inverted U-shaped bracket 30 having the bottom ends of its side arms securely attached to an enlarged metallic plate 31. The inverted U-shaped brackets 30 are adapted to be extended upwards through spaced openings 32 formed in the top wall 13 of the housing 10. The openings 32 are slightly smaller than the plates 31 so that the plates will engage the bottom face of the top wall 13 and prevent the U-shaped brackets 30 from being completely pulled through the openings 32.

The carrying handle 29 is of a type to include a handle portion 29ª provided at its ends with spring clips 29ᵇ engageable upon the intermediate arm of the U-shaped bracket 30. When the clips 29ᵇ engage the U-shaped brackets 30, the handle portion 29ª may be manually gripped for carrying the housing about. However, when the carrier is being used as a stand the spring clips 29ᵇ are disengaged from the brackets 30 permitting the brackets to be withdrawn as shown in Fig. 11, thus providing an unobstructed top wall 13 upon which the projector 11 may be positioned as shown in Fig. 6.

Extendable leaves 33 are mounted upon the sides of the top wall 13. These leaves are pivotally mounted upon the sides of the top wall 13 by means of hinges 34. These leaves are adapted to be pivoted to a horizontal position to be extended laterally from the side of the top wall 13 as shown in Figs. 6 and 7 to increase the overall top surface of this top wall.

Means is provided for holding the leaves 33 in their laterally extended positions from the sides of the top wall 13. This means comprises a bracket for each end of each of the leaves 33. Each of these brackets comprises a pair of sections 35 having their adjacent ends pivotally attached together with the free end of one section attached to a lug 36 mounted upon the bottom face of the leaf 33.

The free end of the other section is pivotally attached to the inside face of its respective end wall 15 by means of a pin 37. The construction of the brackets for supporting the leaves 33 is such that when the leaves 33 are pivoted to the operative positions the sections of the brackets shape a dead center to retain the shelves in their operative positions until such time as the sections of the brackets are manually urged to again pass their dead center.

The operation of this invention is as follows:

The carrier is carried from place to place in the condition shown in Fig. 1. When the destination is reached where it is desired to show a particular film the carrier is transformed into a stand by pivoting the covers 20 to an outwardly and downwardly diverged position as shown in Fig. 4 to cause these covers to act as legs to support the housing 10 at an elevation. The spring clips 29b of the carrying handle 29 are then disengaged from the U-shaped brackets 30 of the lugs, permitting these lugs to be withdrawn from the openings 32 formed in the top wall 13 of the housing 10.

The leaves 33 are then pivoted to their laterally extended positions by lifting the same upwards causing the sections 35 of the brackets to pass the dead center and maintain these leaves in their operative position. The projector 11 is then taken from its position upon the bottom wall 14 as shown in Fig. 4 and is rested upon the top face of the top wall 13 as illustrated by the dot and dash lines in Fig. 6. The films 12 are then removed from their auxiliary shelf 19 and placed in the projector 11 and the electric lead cord 11a thereof is plugged into a conventional house outlet for supplying the needed current to run the projector 11. To again collapse the stand to the position shown in Fig. 1, the above procedure is reversed.

According to the modification of the invention shown in Figs. 13 to 16, the construction of the combined carrier and stand is similar to that previously described except for the provision of a novel means for retaining the U-shaped brackets 30 of the lugs to which the carrying handle 29 is attached in an operative or inoperative position without requiring the complete removal of these U-shaped brackets 30' from the openings 32.

In this form of the invention the U-shaped brackets 30' are formed of tubular material and a plate 40 is mounted within each of the arms of the bracket 30'. Each of these plates is provided with a pair of outwardly extending pins 41. These pins 41 are arranged in a spaced superimposed position upon each of the arms of the brackets 30. These pins 41 are projected through openings provided by one of the side walls of each of the arms of the brackets. Between the pins 41 each of the plates 40 is provided with a stem 42 which extends through an opening formed in the said wall of the brackets between the pins 41.

A leaf spring 43 is mounted upon the other side of the plate 40 and engages the inside face of the tubular material from which the brackets 30' are formed and urges the pins 41 and stem 42 into the extended position. One face of the material of the top wall 13 surrounding the opening 32 is provided with a spaced pair of horizontally arranged openings 44. When the bottommost pins 41 engage these openings 44 the brackets 30' of the lugs will be projected beyond the top face of the top wall 13 to receive the spring clips 29b of the carrying handle 29. However, when the spring clips 29b are removed from the brackets 30' of the lugs, it is possible to press the plate inwards by pressing the stem 42 to cause the bottommost pins to be withdrawn from the openings 44.

The brackets 30' may now be dropped to a lowered position to permit the topmost pins 41 to be engaged with the openings 44 to retain the brackets 30' in an inoperative position with the intermediate arms thereof flush with the top face of the top wall 13. In other respects this form of the invention is similar to that previously described and like reference numerals are used for identifying like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon.

2. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, said grooves being of a depth equal to the thickness of the transverse arms of said U-shaped brackets to completely enclose the transverse arms when said handle is removed from said brackets.

3. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, said means comprising plates secured to the bottom ends of the side arms of said U-shaped brackets to engage the bottom face of the top wall about said openings.

4. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, and means for holding said U-shaped brackets in an operative raised position or in an inoperative lowered position.

5. In a carrier for a motion picture projector having a housing formed with a top wall upon which the projector is rested when in use, the top wall being formed with longitudinaly spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, and means for holding said U-shaped brackets in an operative raised position or in an inoperative lowered position, said U-shaped brackets being formed of tubular material and each of said side arms of said brackets being formed with a vertically spaced pair of openings on one side thereof, said holding means comprising a plate within each of said side arms, a pair of pins mounted on each of said plates and extended through the pair of openings of its respective side arm for selectively engaging a complementary opening formed in the material of the top wall defining said first-mentioned openings in either of the two positions of said brackets, resilient means holding said plates in positions in which their respective pins are extended from the openings of their respective side arms and engaged with said complementary openings, and means for moving said plates against the action of said resilient means to withdraw the engaged pins from said complementary openings to free said brackets to be moved between either of its two positions.

6. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, and means for holding said U-shaped brackets in an operative raised position or in an inoperative lowered position, said U-shaped brackets being formed of tubular material and each of said side arms of said brackets being formed with a vertically spaced pair of openings on one side thereof, said holding means comprising a plate within each of said side arms, a pair of pins mounted on each of said plates and extended through the pair of openings of its respective side arms for selectively engaging a complementary opening formed in the material of the top wall defining said first-mentioned openings in either of the two positions of said brackets, resilient means holding said plates in positions in which their respective pins are extended from the openings of their respective side arms and engaged with said complementary openings, and means for moving said plates against the action of said resilient means to withdraw the engaged pins from said complementary openings to free said brackets to be moved between either of its two positions, said resilient means comprising a leaf spring mounted on each of said plates and bearing against the adjacent face of the tubular material from which the U-shaped brackets are made.

7. In a carrier for a motion picture projector having a housing formed with a top wall upon which the projector is rested when in use, the top wall being formed with longitudinally spaced pairs of openings, the top ends of each pair of openings being connected by grooves in the top face of the top wall, inverted U-shaped brackets having the free ends of their side arms slidably extended through said openings with their transverse arms in alignment with said grooves, a handle having its ends releasably connected to the transverse arms of said U-shaped brackets, and means on the bottom ends of the side arms of said U-shaped brackets for engaging the bottom face of the top wall to prevent the withdrawal of said side arms from said openings when the housing is being carried about by the handle, whereby when the projector is to be rested on the top wall, said handle may be disconnected from said brackets leaving the brackets free to slide downward in the openings with the transverse arms engaging in said grooves leaving the top wall unobstructed to have the projector rested thereon, and means for holding said U-shaped brackets in an operative raised position or in an inoperative lowered position, said U-shaped brackets being formed of tubular material and each of said side arms of said brackets being formed with a vertically spaced pair of openings on one side thereof, said holding means comprising a plate within each of said side arms, a pair of pins mounted on each of said plates and extended through the pair of openings of its respective side arms for selectively engaging a complementary opening formed in the material of the top wall defining said first-mentioned openings in either of the two positions of said brackets, resilient means holding said plates in positions in which their respective pins are extended from the openings of their respective side arms and engaged with said complementary openings, and means for moving said plates against the action of said resilient means to withdraw the engaged pins from said complementary openings to free said brackets to be moved between either of its two positions, said moving means comprising a manually pressable stem mounted on each of said plates between its respective pair of pins and projected through an opening formed in the tubular material of its respective side arm between the respective pair of openings.

MAX GOLD.

REFERENCES CITED

The following references are of record in the file of this patent:

UNITED STATES PATENTS

| Number | Name | Date |
| --- | --- | --- |
| 734,757 | Shuchle et al. | July 28, 1903 |
| 827,412 | Bostelman | July 31, 1906 |
| 1,035,648 | Small | Aug. 13, 1912 |
| 1,167,046 | Campbell | Jan. 4, 1916 |
| 1,385,094 | Porter | July 19, 1921 |
| 1,811,628 | Hollerith | June 23, 1931 |
| 1,958,587 | Mitchell et al. | May 15, 1934 |
| 2,190,498 | Williams | Feb. 13, 1940 |
| 2,218,256 | Bechtel | Oct. 15, 1940 |